United States Patent [19]

Mizuno et al.

[11] Patent Number: 5,124,965
[45] Date of Patent: Jun. 23, 1992

[54] OPTICAL HEAD SUPPORTING APPARATUS

[75] Inventors: Osamu Mizuno, Osaka; Tohru Nakamura, Katano; Noboru Kikuchi, Hirakata, all of Japan

[73] Assignee: Matsushita Electric Industrial Co., Ltd., Osaka, Japan

[21] Appl. No.: 413,676

[22] Filed: Sep. 28, 1989

[51] Int. Cl.$^5$ ............................................. G11B 7/08
[52] U.S. Cl. ............................. 369/44.22; 369/44.14; 369/44.15; 359/813; 359/824
[58] Field of Search ............... 369/44.11, 44.15, 44.13, 369/44.16, 44.14, 44.12, 44.22, 44.17, 256; 360/114; 250/201.5; 259/813, 824

[56] References Cited

U.S. PATENT DOCUMENTS

| | | | |
|---|---|---|---|
| 4,592,037 | 5/1986 | Ohnuki | 369/44.14 |
| 4,842,392 | 6/1989 | Nakamura et al. | 369/44.22 |
| 4,878,214 | 10/1989 | Hinotani | 369/44.15 X |

FOREIGN PATENT DOCUMENTS

| | | |
|---|---|---|
| 61-42741 | 3/1986 | Japan . |
| 61-137229 | 6/1986 | Japan . |
| 63-48620 | 3/1988 | Japan . |

Primary Examiner—Roy N. Envall, Jr.
Assistant Examiner—Hung T. Dang
Attorney, Agent, or Firm—Wenderoth, Lind & Ponack

[57] ABSTRACT

An optical head and supporting apparatus has an optical head for irradiating a parallel beam in a direction perpendicular to a recording surface of an optical disk, an objective lens rigidly mounted on the optical head for receiving the parallel beam from the optical head, tracking drive coils for driving the optical head over the whole recording range in a first direction transverse to the recording tracks of the optical disk, focusing drive coils for driving the optical head in a second direction perpendicular to the recording surface of the optical disk, and a support mechanism made of wire-shaped elastic bodies for supporting the optical head freely movably in the first and second directions over the whole recording range in the first direction of the optical head. The support mechanism is fixedly mounted through elastic bodies on a part of a structural body independent of movement of the optical head. Seek, tracking and focusing movements of a beam spot can be achieved in such a way that the wire-shaped eleastic bodies are elastically deformed by forces developed through the tracking drive coils and focusing drive coils thereby to move the optical head two-dimensionally.

11 Claims, 5 Drawing Sheets

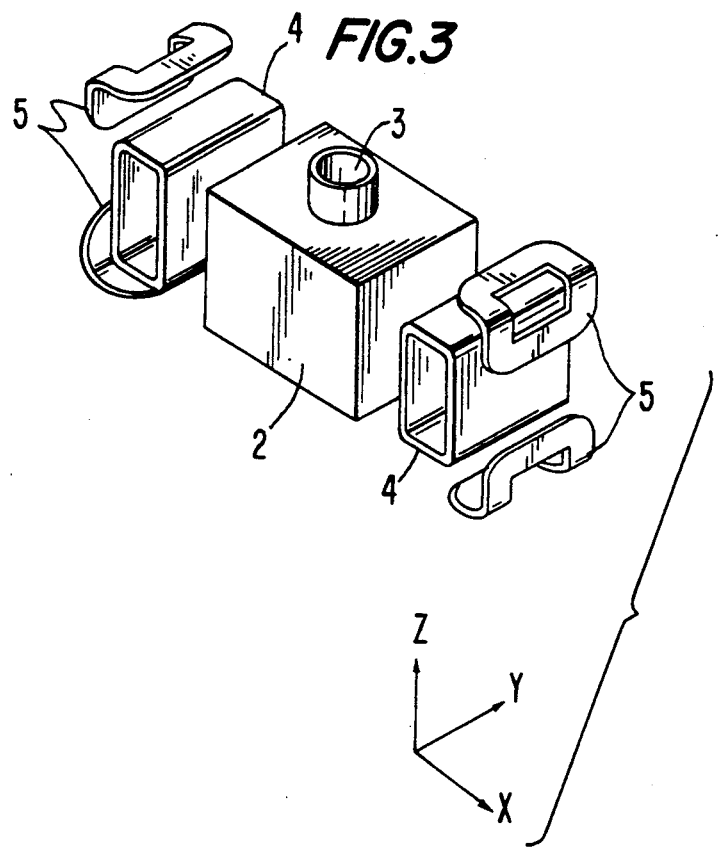
FIG.3
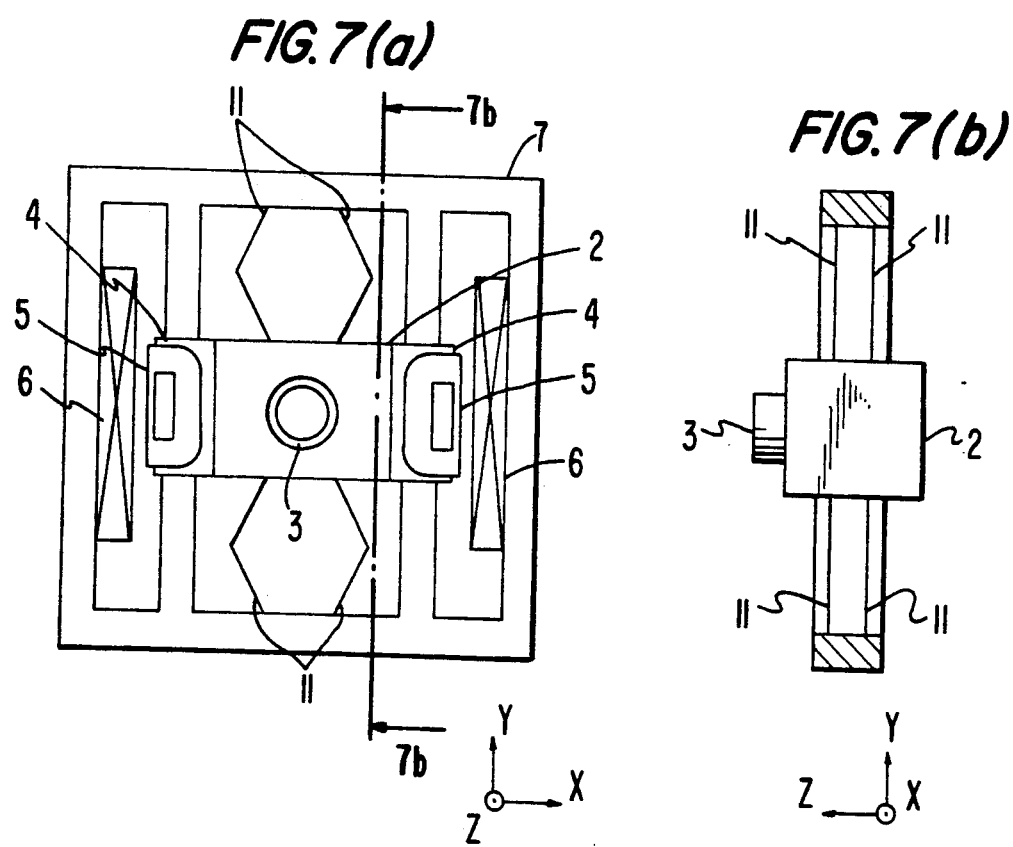
FIG.7(a)
FIG.7(b)

OPTICAL HEAD SUPPORTING APPARATUS

BACKGROUND OF THE INVENTION

1. Field of the Invention

This invention relates to an optical head supporting apparatus for use in optical recording and reproducing systems which are to be used for an external memory unit of computers, a recording and reproducing unit for information such as, for example, audio signal and video signal, or the like.

2. Description of the Prior Art

With the recent trend of developments of computer and fast and extensive transmission means of information, non-volatile memories which are low in price, high in density, large in storage capacity as well as having high-speed data transportation capacity have been demanded Many of them use a magnetic disk system. However, there exist such problems as low recording density, high cost per one information unit, a large limitation of application environment and so on. Under such circumstances, the optical recording technique has come into the limelight as a technology to solve these problems.

When optical disk memories based on the optical recording technique are to be used, the technology for moving an optical head for recording information on the disk at a high speed is required, so that the optical head supporting apparatus thereof has been required to possess such properties as, for example, high accuracy, high rigidity and low friction. Therefore, many optical head supporting apparatus have been proposed recently.

Optical disks generally have a concentric or spiral recording track and a recording surface for data which is covered with a transparent substrate permeable to a laser beam. In order to record or reproduce data, it is necessary to apply a laser beam to the recording track by passing the beam thereof through the transparent substrate thereby to convergently irradiate it onto the recording surface. If a substantially converged parallel laser beam is entered directly into a transparent substrate, the laser beam will be scattered by surface defects or foreign matters, resulting in a deterioration in data quality to be recorded. In order to eliminate such an adverse effect on the data quality, convergent means such as, for example, an objective lens must be arranged in the neighborhood of the transparent substrate so that the laser beam can become a large laser spot on the surface of the transparent substrate and a converged laser spot on the recording surface thereof. That is, in recording and reproducing information using an optical disk, the objective lens is required to move up to the neighborhood of a recording track that is desired. Movement of the objective lens transversely to the recording track of an optical disk is called "seek movement". In addition, recording track of an optical disk has an eccentricity, which means that a beam spot on the recording surface has to follow the eccentricity. This is called "tracking movement". How to improve the speed for performing an accurate seek and tracking movements with respect to a specific recording track is the most essential problem to reduce the access time of an instrument. Further in addition, the optical disk has a surface deflection, so that in general the objective lens is moved in the direction perpendicular to the recording surface thereby to follow the deflection of the recording surface in order to form a converged beam spot thereon. This movement is called "focusing movement".

As a result, the objective lens is required to be moved two-dimensionally, a first direction which is either the seek or tracking direction parallel to the recording surface, and a second direction which is the focusing direction perpendicular thereto.

Conventional optical head supporting apparatus generally has guide means such as, for example, a guide shaft or guide surface arranged in the radial direction of an optical disk. A carriage is provided which moves linearly in accordance with the guide means. The carriage has a plurality of rolling members to carry out a relative movement with the guide means at a low friction. The carriage has an optical head at least including an objective lens. Seek movement is achieved by moving the carriage in the radial direction of an optical disk. However, since the mass becomes comparatively large as a result of such a structure so that a plurality of rolling members must be provided, the tracking movement is a slight movement of the objective lens only in the first direction. Also, the carriage is unmovable in the second direction, so that the focusing movement is achieved by moving only the objective lens in the second direction. Accordingly, the carriage is provided with an objective lens actuator for causing the objective lens to carry out tracking and focusing movements. These structures are disclosed by Japanese Patent Application Laid-Open No. 63-48620.

With such a structure, however, the following problems exist:

If foreign materials such as, for example, dust enter between the rolling members of the carriage and the guide means during seek movement, a large resistance to rolling will be developed. In general, such a rolling resistance is non-linear and has a large adverse effect on the control of seek movement.

Also, in order to carry out an access to a preferable recording track, the seek movement by the carriage and the tracking movement by the objective lens are required, each of which is a translation movement in the first direction so that their movements have duplicated degrees of freedom. Looked at from the viewpoint of a control system, the case where the carriage is to be moved and the case that the objective lens is to be moved are different in mode from each other, which means that each case requires providing an appropriate driving system and control system. In addition, the objective lens actuator contains a tracking mechanism and a focusing mechanism, each of which has vibration crosstalk as well as a resonance with a coarse seek movement of the carriage, so that the arrangement becomes a complex resonance system resulting in extreme difficulty of control. Further in addition, in order to hold a preferable recording track within the movable range of the tracking mechanism during seek movement, it is necessary to know the present position of the objective lens in the tracking direction, or to keep the objective lens always at a specific position in the movable range of the tracking mechanism, for example, at the middle point of the movable range thereof. This is because when the coarse seek movement is carried out supposing that the objective lens is positioned at the middle point of the movable range of the tracking mechanism, if the objective lens is positioned at the end of the movable range of the tracking mechanism by the tracking movement after completion of the coarse seek movement, the preferable recording track may be possibly be out of the movable range of the tracking mechanism.

Also, in order to move the carriage smoothly in the first direction, first of all, the surface accuracy of the contact area between the rolling members and the guide means will arise as a problem to be overcome, and then their relative position accuracy and the mounting accuracy of a plurality of rolling members are required to be maintained, which constitute a factor which increases the cost. In addition, durability and shock resistance are to be pointed out as a problem for the guide means and the rolling members for long term use.

SUMMARY OF THE INVENTION

An object of this invention is to provide an optical head supporting apparatus which is capable of performing the tracking and focusing movements at a high speed with no use of rolling members and guide means as well as having superior controllability.

In order to attain the above-mentioned object, an optical head supporting apparatus of this invention comprises an optical head for irradiating a parallel beam in a direction perpendicular to the recording surface of a recording medium, an objective lens which is fixedly mounted on the optical head and converges the parallel beam from the optical head, tracking drive means for driving the optical head over the whole recording range in a first direction traversing recording tracks of the recording medium, focusing drive means for driving the optical head in a second direction perpendicular to the recording surface of the recording medium, and supporting means for fixedly mounting the optical head by elastic body means on a part of a structural body independent of the movement of the optical head to support the optical head so it is freely movable in the first and second directions over the whole recording range in the first direction.

With the structure as described above, the optical head is carried via the elastic body means on the structural body and if a force acts on the optical head, the elastic body means will be deformed thereby to make movement of the optical head possible. Accordingly, the optical head can be freely moved in the first and second directions, and since in both the focusing and tracking movements the controlled object is a simple mass and spring system having the same mass, non-linear resistances such as, for example, friction can be eliminated, the control system can be simple in structure and the controllability can be largely improved. In addition, there is no need to use rolling members and retaining members. Further in addition, the optical head itself becomes movable in the second direction, so that the driving mechanism for the objective lens is not needed. As a result, the mass of the optical head is extensively reduced and the access time thereof is easily reduced.

BRIEF DESCRIPTION OF THE DRAWINGS

FIG. 1 (b) is a cross-sectional view of the optical head supporting apparatus shown in FIG. 1 (a) taken on line 1b—1b FIG. 1 (a).

FIG. 2 (b) is a cross-sectional view of the optical head supporting apparatus shown in FIG. 1 (a) taken on line 2b—2b of FIG. 1 (a).

FIG. 3 is an exploded perspective view showing the assembly of a focusing coil and a tracking coil to the optical head of the apparatus of the first embodiment.

FIG. 4 (b) is a cross-sectional view of the apparatus shown in FIG. 4 (a) taken on line 4b—4b of FIG. 4 (a).

FIG. 5 (b) is a cross-sectional view of the apparatus shown in FIG. 5 (a) taken on line 5b—5b of FIG. 5 (a).

FIG. 6 (b) and (c) are a cross-sectional view and a front view of the apparatus shown in FIG. 6 (a), respectively.

FIG. 7 (a) is a top plan view of an optical head supporting apparatus showing a second embodiment of this invention.

FIG. 7 (b) is a cross-sectional view of the apparatus shown in FIG. 7 (a) taken on line 7a—7a of FIG. 7 (a).

DESCRIPTION OF THE PREFERRED EMBODIMENTS

Figure 1A:
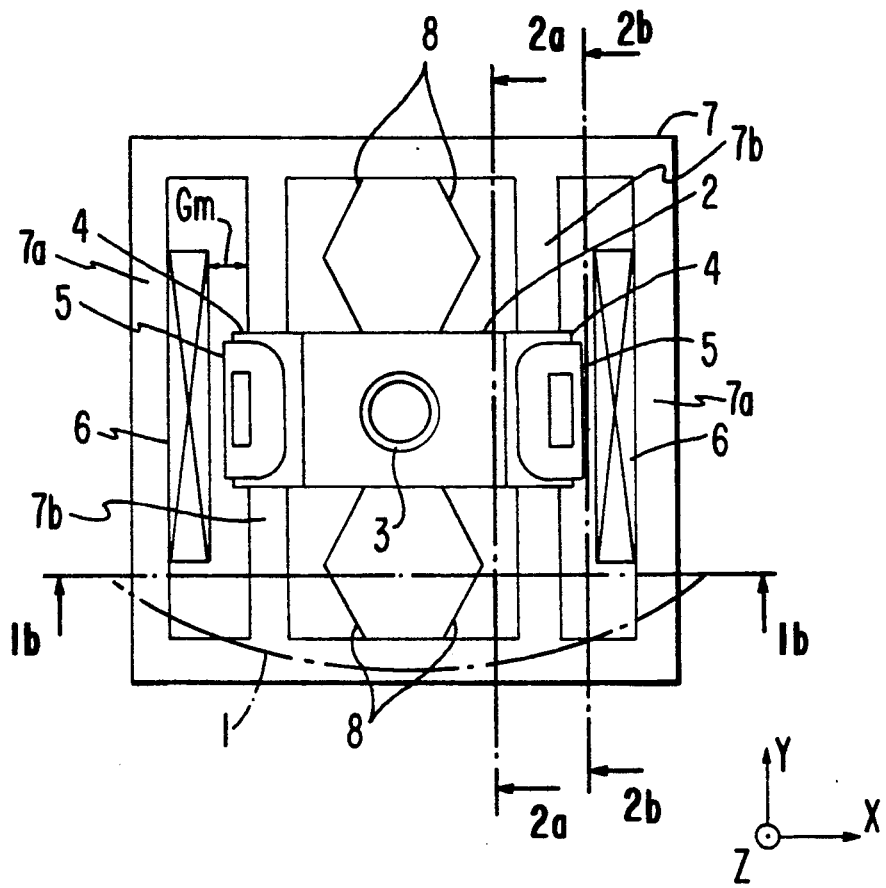
FIG. 1 (a) is a top plan view of an optical head supporting apparatus in accordance with a first embodiment of this invention.
Figure 1B:
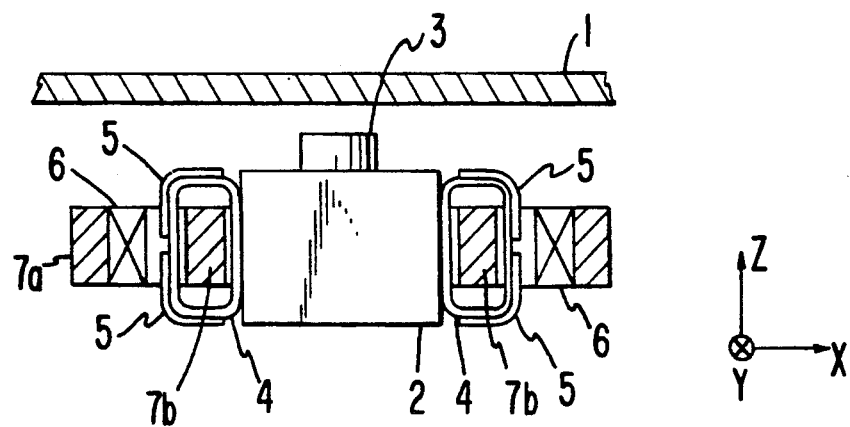
Figure 2A:
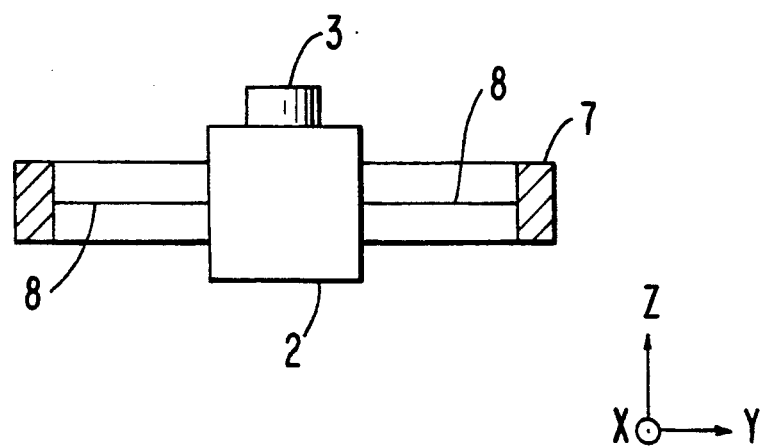
FIG. 2 (a) is a cross-sectional view of the optical head supporting apparatus shown in FIG. 1 (a) taken on line 2a—2a of FIG. 1 (a).
Figure 2B:
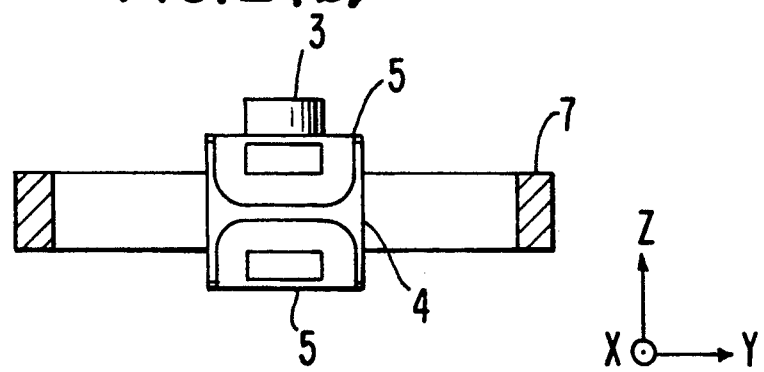

Hereinafter, an optical head supporting apparatus in accordance with embodiments of this invention will be described while referring to the drawings. FIG. 1 (a) is a top view of an optical head supporting apparatus of a first embodiment of this invention and FIG. 1 (b) is a cross-sectional view of the same taken on line 1b—1b of FIG. 1 (a). FIGS. 2 (a) and (b) are cross-sectional views of the supporting apparatus of this embodiment shown in FIG. 1 (a) taken on lines 2a—2a and 2b—2b, respectively. FIG. 3 is an exploded perspective drawing showing the arrangement of each coil in the apparatus of this embodiment. In FIGS. 1 (a) and (b), 2 (a) and (b) and 3, directions of coordinate axes x, y, and z are defined as shown in these figures, respectively. An optical disk 1 which is a disk-shaped recording medium is placed in parallel with the x-y surface and rotated about the z-axis by the turn-table of a spindle motor clamped at the center (not shown). The optical disk 1 has a data recording surface which is provided with a recording track in a spiral form with the rotational center as the center. The recording track is partitioned in the rotational direction by a sector which constitutes a specific recording unit, and has address information recorded in advance in the sector unit. Strictly speaking, the recording track is not completely spiral, there existing an eccentricity to the rotational center thereof. In addition, the recording surface may runout from a hypothetical standard position. An optical head 2 generates a parallel beam for the recording, reproducing or erasing use in the z-axis direction. An objective lens 3 is rigidly mounted on the optical head 2 and converges the parallel beam from the optical head 2 onto the recording surface of the optical disk 1 to form a beam spot thereon. A magnet 6 forms a magnetic circuit with a magnetic yoke 7 made of a magnetic body thereby to generate a magnetic flux in the x-axis direction at a magnetic gap Gm. Doglegged wire elastic bodies 8 are provided, and each has one end fixedly connected to the optical head 2 and the other end fixedly connected to the magnetic yoke 7. Under no force of gravitation, the elastic bodies 8 are arranged to be in a plane perpendicular to the z-axis as shown in FIG. 1 (a) and FIG. 2 (a), and the optical head 2 is supported by four elastic bodies on the magnetic yoke 7 and at the same time, these elastic bodies 8 deform elastically by a force acting on the optical head 2 thereby to permit the optical head 2 to do focusing and tracking movements. Tracking coils 4 apply a force in the y-axis direction to the optical head 2, and each winds around a part of the magnetic yoke 7 in a specifically spaced-apart relationship therewith. The magnetic yoke 7, magnet 6 and tracking coil 4 are arranged so as to allow the movable range of the optical head 2 in the tracking direction (y-axis direction) to cover the whole recording area of the optical disk 1. The magnetic yoke 7 has first and second yoke portions 7a and 7b which extend in parallel to each other in the tracking direction. The magnet 6 extending in the tracking direction is fixed to the first yoke portion 7a so as to oppose the second yoke portion 7b. The length of the magnet 6 in the tracking direction should be larger than the width of the whole recording area of the optical disk in the tracking direction so that the magnetic flux generated by the magnet 6 exists in the area above the whole recording area. The tracking coil 4 fixed to the optical head 2 is wound to surround a part of the second yoke portion 7b with its inner surface spaced a distance from the second yoke portion 7b. In other words, the second yoke portion 7b is inserted into the tracking coil 4. When a current is caused to flow through the tracking coil 4, a driving force in the tracking direction is generated by the interaction of the current flowing through the tracking coil 4 and the magnetic flux generated by the magnet 6. Since the magnetic flux is present to cover the whole recording area in the tracking direction, the tracking coil 4 and the optical head to which the tracking coil is fixed can be moved in the tracking direction in a range to cover the whole recording area. Focusing coils 5 apply a force in the z---; axis direction t-o the optical head 2, each and is structured so that a flat, annular coil is bent at 90° along the y-axis. In FIG. 3, the arrangement of the tracking coils 4 and the focusing coils 5 are shown schematically. The tracking coil 4 is mounted one on each side surface of the optical head 2, there thus being two in total. The focusing coil 5 is two mounted at corner portions of the opposite surface of each tracking coil 4 from the surface confronting the optical head 2, there thus being four in total. In the portion where the tracking coils 4 and the focusing coils 5 enter into the magnetic gap Gm, a magnetic flux in the x-axis direction passes through each coil. In FIG. 1 (b), the cross-section of the elastic bodies 8 is not shown.

The operation of the optical head supporting apparatus structured as above will be explained below.

Figure 4A:
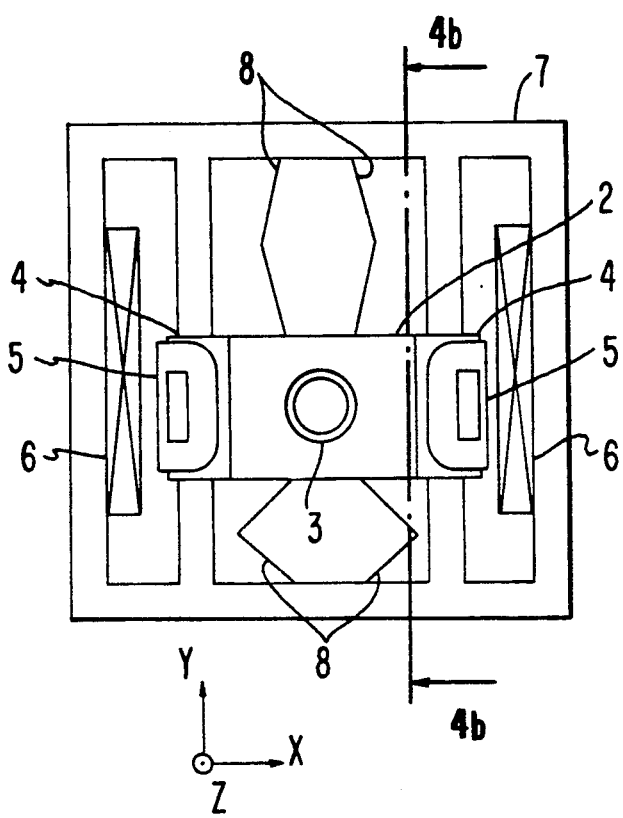
FIG. 4 (a) is a top plan view of the optical head supporting apparatus of this embodiment in which the optical head is moved from the position in FIG. 1 (a).
Figure 4B:
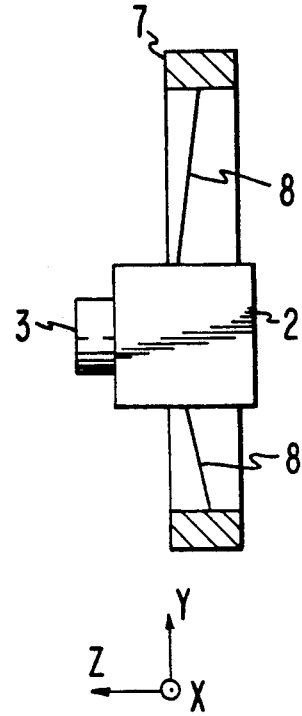

When reproducing, recording or erasing of data is to be executed with respect to an optical disk 1, it is necessary that a beam spot formed by an objective lens 3 moves to a preferable recording track on the optical disk 1, follows the eccentricity of the recording track thus preferred and then moves to a preferable sector thereof. First, confirmation of the present position of the optical head is made. If electricity is caused to flow in the focusing coil 5, a magnetic flux in the x-axis direction is generated in the magnetic gap Gm by the magnetic circuit consisting of the magnet 6 and magnetic yoke 7, so that a force in the z-axis direction will be developed in the focusing coil 5 by the interaction of the magnetic flux and the electricity in the y-axis direction of the focusing coil 5. Thus, the optical head 2 is subjected to a force in the z-axis direction via the tracking coil 4 on which the focusing coil 5 is mounted. In this case, the elastic bodies 8 are deformed as shown in FIG. 4 (b) thereby to move the optical head 2 in the z-axis direction. By controlling the driving current of the focusing coils 5, the beam spot sent from the objective lens 3 can be convergently focused on the recording surface of the optical disk 1 independent of the existence of deflection of the recording surface of the optical disk 1. Therefore, reflection of the beam spot can be detected, so that a tracking error signal of the recording track is detected thereby to make possible the detection of the eccentricity of the recording track.

Next, the tracking movement is caused to follow the eccentricity of the recording track. If electricity is caused to flow in the tracking coil 4, in the tracking coil 4 is developed a force in the y-axis direction by the interaction of the magnetic flux in the magnetic gap Gm and the electricity flowing in the z-axis direction of the tracking coil 4. Thus, the optical head 2 is subjected to a force of the y-axis direction by the tracking coils 4. In this case, the elastic bodies 8 are deformed thereby to allow the optical head 2 to move in the y-axis direction. By controlling the driving current in the tracking coils 4, the objective lens 3 fixedly mounted on the optical head 2 is slightly moved thereby to follow the recording track. Under this condition, the address is read to determine the present position.

Then, seek movement is made to move the optical head 2 to a desired recording track. If electricity sufficient to cause a movement of the optical head 2 from the address of the present position thereof to a preferable address is caused to flow to the tracking coils 4, the optical head 2 is subjected to a force in the y-axis direction, the elastic bodies 8 are elastically deformed as shown in FIG. 4 (a), and the optical head 2 is moved in the y-axis direction.

Also, by finely controlling the amount of electricity flowing in the tracking coils 4, a beam spot can be caused to follow the eccentricity of a preferable recording track. Resistance of the elastic body 8 becomes substantially linear in its elastic range, leading to extremely easy control.

Under this condition, the address is read. If the address thus read is not at a preferable recording track, fine seek and tracking movements are carried out again. If a beam spot is subjected to modulation at the time of arrival at the preferable recording track and attainment of a preferable sector thereof, data are recorded on or erased from the optical disk 1, or by observing the condition of a reflection beam, they are reproduced.

As described above, the optical head supporting apparatus of this embodiment carries out the focusing, seek and tracking movements by moving the optical head which is a single mass via the elastic bodies 8 as the supporting body, so that it can be made extremely simple in structure as a vibration system, resulting in outstandingly improved controllability. In addition, additional masses on the optical head 2 such as, for example, carriage or objective lens driving mechanism as are needed in the conventional example are reduced, so that higher response of the optical head 2 becomes possible.

Figure 5A:
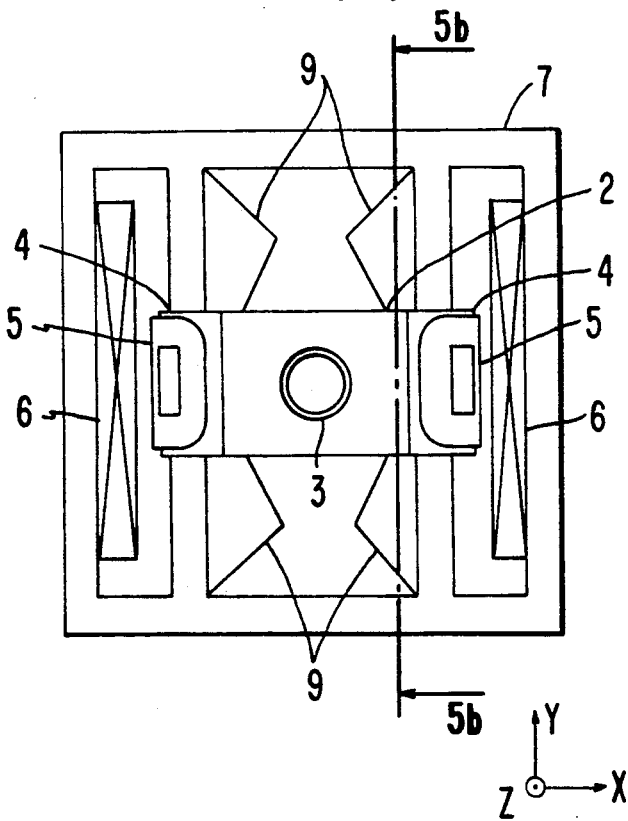
FIG. 5 (a) is a top plan view of the optical head supporting apparatus of this embodiment showing a first modification of elastic bodies.
Figure 5B:
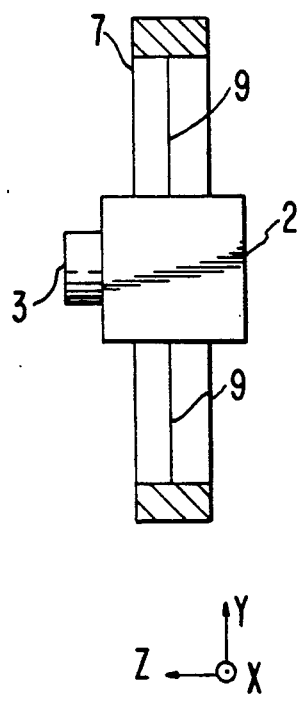
Figure 6A:
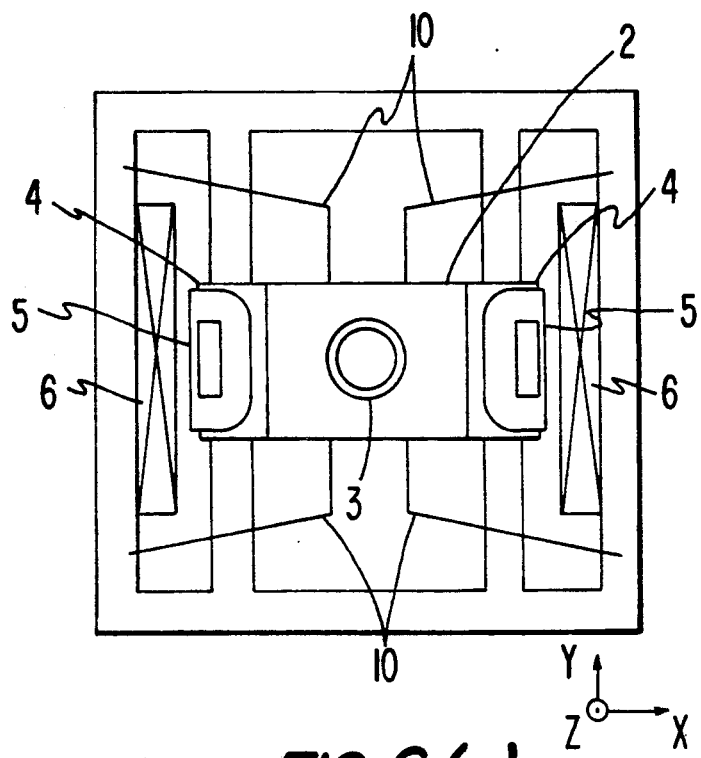
FIG. 6 (a) is a top plan view of the optical head supporting apparatus of this embodiment showing a second modification of the elastic bodies.
Figure 6B:
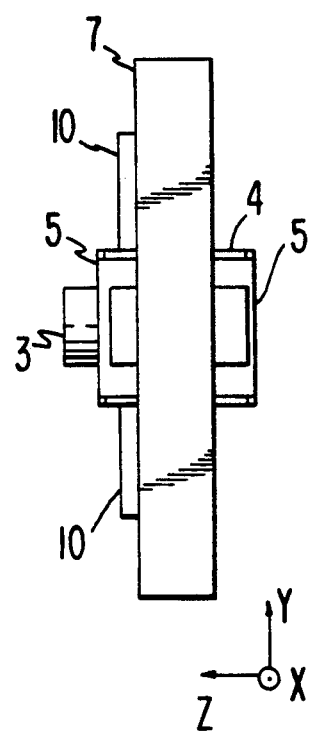
Figure 6C:
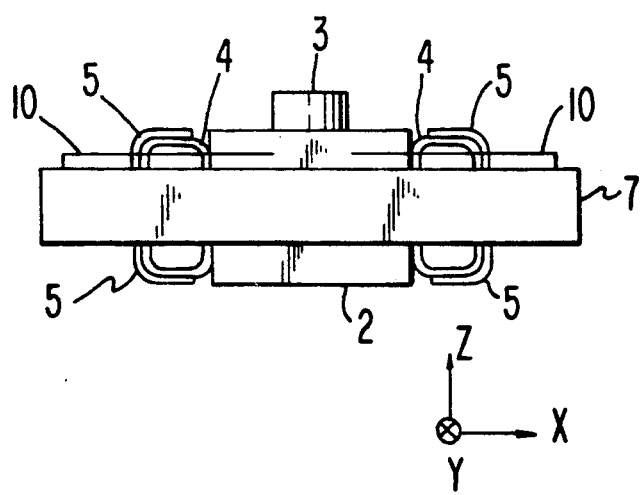

The elastic bodies 8 are shaped as shown in FIG. 1 (a) in this embodiment, but these can be made as shown in FIGS. 5 (a) and (b), and FIGS. 6 (a), (b) and (c).

FIG. 5 (a) shows a modification example of the apparatus shown in FIG. 1 (a), in which elastic bodies 9 are different in shape from those in FIG. 1 (a).

FIG. 5 (b) is a cross-sectional view of the apparatus shown in FIG. 5 (a) taken on line 5b—5b of FIG. 5 (a). As shown in FIG. 5 (b), the elastic bodies 9 are connected to the optical head 2 in the substantially same way as that shown in FIG. 2 (a).

FIG. 6 (b) is a drawing of the apparatus shown, in FIG. 6 (a) looking from the positive direction of the x-axis, and FIG. 6 (c) is a drawing of the same looking from the negative direction of the y-axis. The apparatus shown in FIG. 6 (a) is different form the apparatus shown in FIG. 1 (a) in that elastic bodies 10 in the former are different in shape from the elastic bodies 8 in the latter. As clear from FIGS. 6 (b) and (c), the methods of connecting the elastic bodies 10 to the optical head 2 and the magnetic yoke 7 are also different from those in the apparatus shown in FIG. 1 (a).

Selection of the shape of these elastic bodies can be made so as to be adapted to the structure of an apparatus and these operate in the same manner as those of the apparatus shown in FIG. 1 (a).

In addition, use of square-in-cross-section elastic bodies makes it possible to improve their rigidity around the shaft, thus making them capable of suppressing a rotation mode detrimental to the optical head.

Hereinafter, an optical head supporting apparatus in accordance with a second embodiment of this invention will be described while referring to the drawings.

FIGS. 7 (a) and (b) are a top view of an optical head supporting apparatus of the second embodiment of this invention and a cross-sectional view of the same taken on line 7b—7b of FIG. 7 (a), respectively. An optical head 2, an objective lens 3, tracking coils 4, focusing coils 5, a magnet 6 and a magnetic 7 in FIG. 7 (a) are the same types as those in FIG. 1 (a), respectively. Elastic bodies 11 are substantially identical in material and shape to those used in the first embodiment. However, the optical head 2 has a different supporting structure therefrom. There are four elastic bodies 11 fixedly mounted on each of the surfaces perpendicular to the y-axis of the optical head 2, there being eight bodies in total. As shown in FIG. 7 (b), the elastic bodies 11 are arranged on two surfaces each perpendicular to the z-axis direction, that is, on each plan are arranged four elastic bodies. The elastic bodies 11 support the optical head 2 against the magnetic yoke 7 and at the same time, elastically deform responsively to a force acting on the optical head 2 thereby to permit the optical head 2 to move.

The operation of the apparatus of this embodiment is substantially the same as that of the apparatus of the first embodiment. However, the apparatus of this embodiment has elastic bodies 11 so structured as to be superimposed in the z-axis direction, so that the movement of the optical head 2 about the x-axis is restrained and the optical head 2 is assured of having a steady translation movement.

In addition, the beam source of a parallel beam to be applied to the objective lens need not to be built in the optical head 2, and it can be provided from any other position internal of the apparatus. In this case, the optical head 2 becomes a mere holder of the objective lens 3 thereby largely reduced in weight, thus making a faster access possible.

Further in addition, the elastic bodies 8, 9, 10 and 11 are made electrically conductive to provide conductors of the tracking coils 4 and the focusing coils 5, so that there is no need to use particular wirings such as, for example, a flexible printed circuit, contributing to a reduction in cost. Still further in addition, by covering the surfaces of the elastic bodies 8, 9, 10 and 11 with a viscoelastic material, a resonance peak damping effect can be achieved. Also, by using a non-magnetic stainless steel material for the elastic bodies 8, 9, 10 and 11, development of a magnetic force caused by a leakage flux from the magnetic yoke 7 can be prevented.

The optical head supporting apparatus of this invention is not limited to the apparatus described above and it is possible to modify it to various configurations.

What is claimed is:

1. An optical head and supporting apparatus, comprising:
   an optical head for irradiating a light beam perpendicular to a recording surface of a recording medium having information tracks in a recording area thereof;
   an objective lens rigidly fixed to said optical head for focusing the light beam on said recording surface;
   a support body extending across the recording area of the recording medium;
   supporting means for freely movably supporting said optical head on said support body for movement in both a first direction traversing the information tracks of the recording medium over the whole recording area of the recording medium and a second direction perpendicular to the recording surface of the recording medium, said supporting means including at least one elastic body on said supporting body;
   focusing drive means for driving said optical head in said second direction; and
   tracking drive means for driving said optical head in said first direction over the whole recording area of the recording medium, said tracking drive means having:
      a magnetic yoke having first and second yoke portions extending parallel to each other in said first direction;
      a magnet extending in said first direction and fixed to said first yoke portion so as to oppose said second yoke portion; and
      a tracking drive coil fixed to said optical head and would so as to surround a part of said second yoke portion and having an inner surface spaced from said second yoke portion.

2. An apparatus as claimed in claim 1, wherein said elastic body has at least four independently deformable areas.

3. An apparatus as claimed in claim 1, wherein said elastic body has a longitudinal axis with at least one non-linear part.

4. An apparatus as claimed in claim 1, wherein said elastic body is made of electrical conductor.

5. An apparatus as claimed in claim 1, wherein said elastic body is a non-magnetic body.

6. An apparatus as claimed in claim 1, wherein said elastic body has a surface covered with a viscoelastic material.

7. An apparatus as claimed in claim 1, wherein said elastic body has a substantially square-shaped section substantially perpendicular to said first direction.

8. An apparatus as claimed in claim 1, wherein said supporting means comprises an elastic body having four independently deformable areas on a first plane which is spaced a first distance in a direction from the recording surface of said recording medium to said optical head, and another elastic body having four deformable areas on a second plane which is spaced a second distance in the direction from the recording surface of said recording medium to said optical head.

9. An apparatus as claimed in claim 1 wherein said elastic body has at least one longitudinal part substantially parallel to the recording surface of the recording medium.

10. An apparatus as claimed in claim 1 wherein said yoke and said magnetic form a magnetic circuit having a magnetic gap with a magnetic field therein, and said focusing drive means includes a focusing drive coil on said optical head, and wherein at least part of said track drive coil and at least part of said focusing drive coil are in the same magnetic gap for being caused to drive said optical head by electromagnetic forces developed by interactions of electricity caused to flow in said tracking drive coil and electricity caused to flow in said focusing drive coil.

11. An apparatus as claimed in claim 10 in which said track drive coil and said focusing drive coil are positioned in said magnetic gap for causing the same magnetic lines of force pass through at least one part of said tracking drive coil and said focusing drive coil.

* * * * *